Dec. 19, 1933.  G. K. BEDUR  1,939,871
APPARATUS FOR VULCANIZING HOSE
Filed Feb. 23, 1932  2 Sheets-Sheet 1
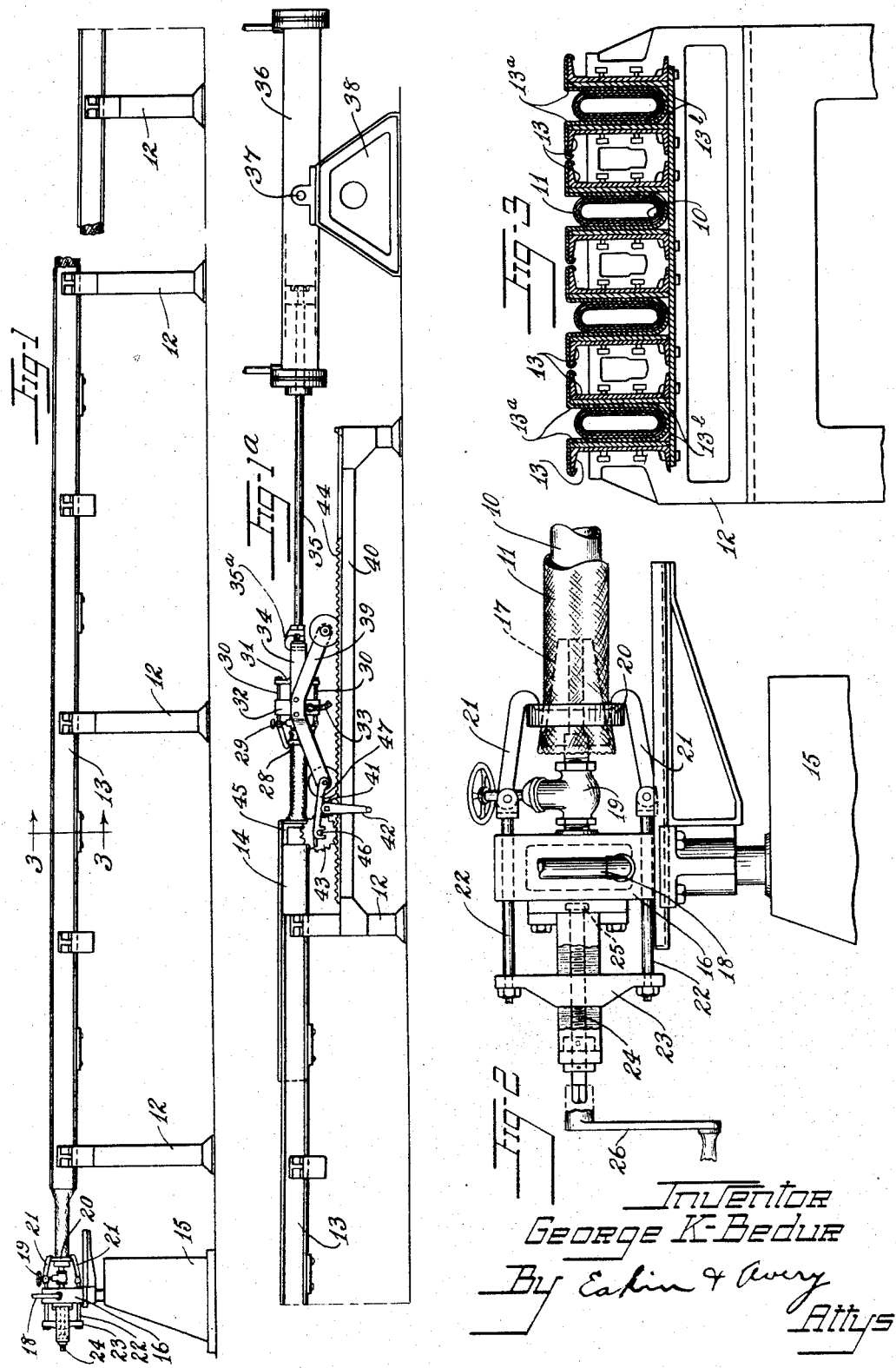
Inventor
George K. Bedur
By Eakin & Avery
Attys.

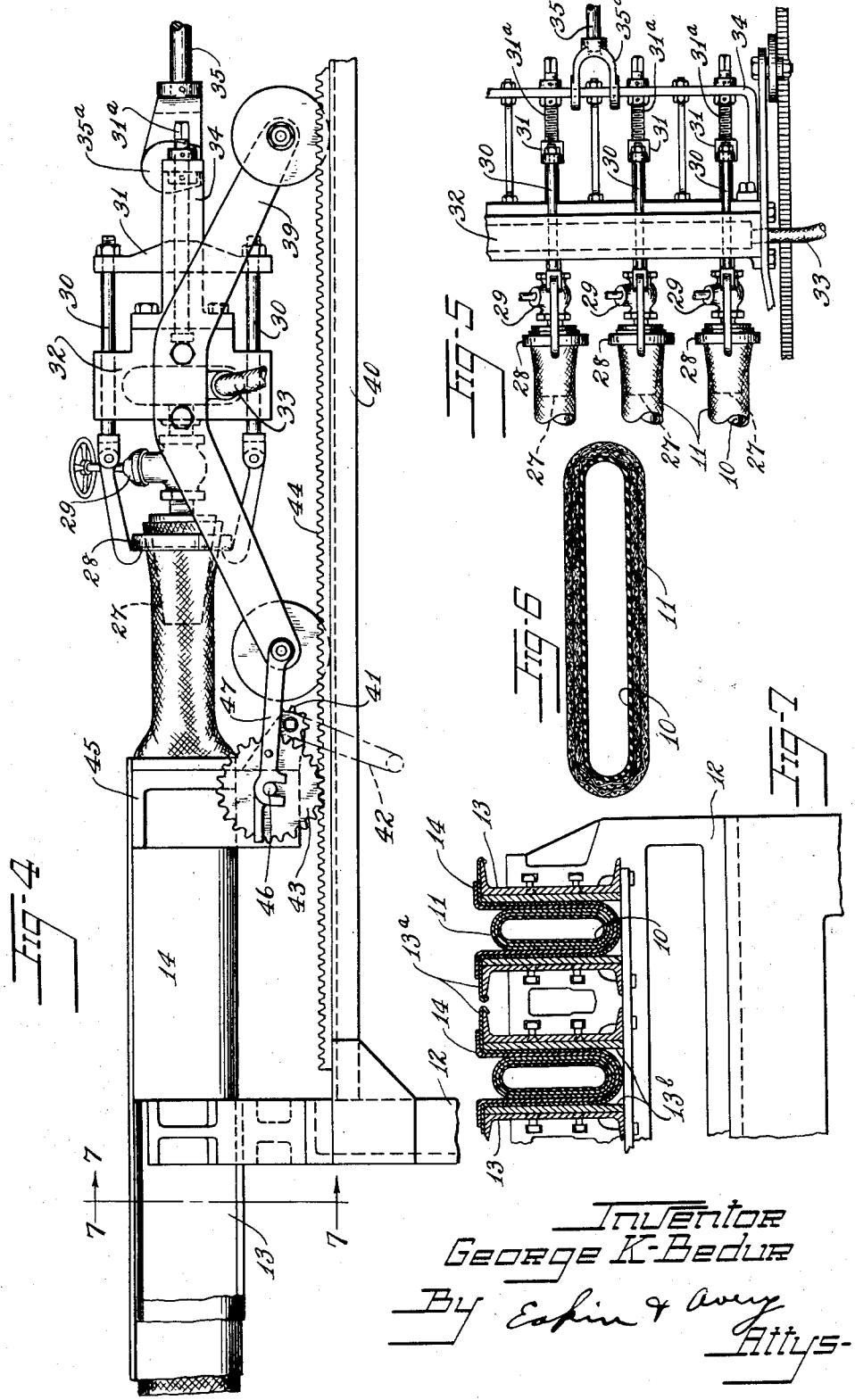

Patented Dec. 19, 1933

1,939,871

UNITED STATES PATENT OFFICE 1,939,871

APPARATUS FOR VULCANIZING HOSE

George K. Bedur, Akron, Ohio, assignor to The B. F. Goodrich Company, New York, N. Y., a corporation of New York Application February 23, 1932. Serial No. 594,410

6 Claims. (Cl. 18—6)

This invention relates to fluid-conducting hose and methods of making the same and its chief objects are economically to provide a hose adapted to be compactly reeled or stored in folded condition, to avoid damaging strains in the hose when it is in flattened condition for storage, and to provide improved apparatus for vulcanizing hose.

Of the accompanying drawings:

Fig. 1 is a side elevation of apparatus embodying and adapted to carry out the invention.

Fig. 1a is a continuation thereof.

Fig. 2 is a side elevation, on a larger scale, of a portion of the apparatus including fluid-conducting means for circulation of a heating fluid through the hose for vulcanization.

Fig. 3 is a cross-section on line 3—3 of Fig. 1.

Fig. 4 is a side elevation of a portion of the apparatus including fluid-conducting means for circulation of a heating fluid through the hose and means for holding the hose under tension during vulcanization.

Fig. 5 is a plan view of parts of the apparatus shown in Fig. 4.

Fig. 6 is a cross-section of the finished hose.

Fig. 7 is a cross-section of the apparatus on line 7—7 of Fig. 4.

Referring to the drawings, the hose chosen for illustration comprises a rubber lining-tube 10 and a two-ply tubularly-woven cover 11, all vulcanized together.

The hose is vulcanized in a flattened or oblong condition without full external mold contact, the flattened condition resulting in a short radius of curvature in the marginal portions of the flattened hose so that the fabric cover 11 will sustain sufficiently high internal fluid pressure to unite the lining tube 10 with the cover 11 in the vulcanizing operation, the latter being held by the internal pressure under adequate transverse tension.

The preferred apparatus for vulcanizing the hose comprises a set of standards 12, 12 on which are mounted a plurality of parallel channel irons 13, 13 defining between parallel walls thereof a plurality of narrow spaces adapted to accommodate lengths of the hose in flattened condition. The channel irons 13, 13 are provided with molding faces 13a, 13a of sheet metal insulated therefrom by layers of heat insulating material 13b, 13b.

The table is preferably inclined to the horizontal, as indicated in Fig. 1, for drainage of the hose during and after vulcanization and for a distance from the lower end of the set of channel irons 13 the spaces between the latter are provided with metal extension lining plates 14, 14 of channel form for supporting and restraining the hose in its region of greatest movement in being stretched.

At the upper end of the set of channel irons 60 means is provided for anchoring the hose and supplying heating fluid to it, the said means comprising a standard 15, a head 16 mounted thereon and provided with a set of projecting, apertured, tapered plugs such as the plug 17 (Fig. 2) and a fluid inlet pipe 18 leading to the plugs through stop-valves such as the valve 19, rings such as the ring 20 adapted to be mounted on the hose and to coact with the respective tapered plugs for anchoring and sealing the ends of the respective lengths of hose, and hooks 21, 21 adapted to engage the rings to force them toward the larger ends of the tapered plugs, the hooks 21 being pivoted upon slide rods 22, 22 slidably projecting through apertures in the head 16 from crossheads such as the cross-head 23 having threaded therethrough screws such as the screw 24 swiveled as at 25 in the head 16 and adapted to be engaged by a hand-crank 26 for drawing the rings 20 toward the larger ends of the plugs 17 to clamp and seal the hose.

Similar means comprising tapered plugs 27, 27, rings 28, 28, valves 29, 29, slide rods 30, 30, crossheads 31, 31, screws 31a, 31a, a head 32 and a fluid outlet pipe 33 are provided at the lower end of the assembly, and the head 32 is detachably secured by means of a yoke 34 to the hooked end 35a of the piston-rod 35 of a fluid pressure cylinder 36 mounted pivotally at 37 (Fig. 1) upon a standard 38 for applying to the hose a uniform tension during vulcanization.

An ancillary head 45 supports the ends of the extension lining plates 14 and is provided with pins 46 adapted to be engaged by latches 47 pivotally attached to the carriage 39.

For preliminarily positioning the heads 32 and 45 for the mounting of the several lengths of hose the head 32 is secured upon a wheeled carriage 39 mounted upon a relatively low table 40 and the carriage 45 is provided with a pinion 41 adapted to be turned by a hand-crank 42 and meshed with a gear 43 coacting with a rack 44 secured to the table.

In the operation of the apparatus the lengths of hose are placed in flattened condition in the spaces between the channel irons 13 and in the U-shaped lining plates 14 and their upper ends are anchored and sealed by means of the plugs 17 and rings 20.

The lower ends are then likewise anchored and sealed by means of the plugs 27 and rings 28, the carriage 39 being suitably positioned by means of the hand-crank 42.

The hose lengths are then held under substantially constant tension by means of the fluid pressure cylinder 36 during vulcanization, which is effected by circulating a heating fluid, preferably steam, through the hose by means of the fluid conducting means described, water of condensation passing out at the lower ends of the hose lengths, and after vulcanization the lengths are uncoupled at their ends and removed from the apparatus.

The vulcanization of the hose requires only inexpensive apparatus and provides the other advantages set out in the above statement of objects.

I claim:

1. Apparatus for vulcanizing hose, the said apparatus comprising means adapted to restrain two opposite sides of the hose to hold it in oblong cross-sectional form without full external mold contact, means for holding the hose under longitudinal tension, and means for passing a heating fluid through the hose.

2. Apparatus for vulcanizing hose, the said apparatus comprising stationarily mounted members adapted to restrain two opposite sides of the hose to hold it in oblong cross-sectional form without full external mold contact, means for holding the hose under longitudinal tension, and means for passing a heating fluid through the hose.

3. Apparatus for vulcanizing hose, the said apparatus comprising members adapted to restrain two opposite sides of the hose to hold it in oblong cross-sectional form without full external mold contact, means for holding the hose under longitudinal tension, and means for passing a heating fluid through the hose the means for holding the hose under longitudinal tension comprising a fluid pressure cylinder.

4. Apparatus for vulcanizing hose, the said apparatus comprising members adapted to restrain two opposite sides of the hose to hold it in oblong cross-sectional form without full external mold contact, means for holding the hose under longitudinal tension, and means for passing a heating fluid through the hose the means for holding the hose under longitudinal tension comprising a head adapter to anchor and seal a plurality of lengths of the hose.

5. Apparatus for vulcanizing hose, the said apparatus comprising members adapted to restrain two opposite sides of the hose to hold it in oblong cross-sectional form without full external mold contact, means for holding the hose under longitudinal tension, and means for passing a heating fluid through the hose the means for holding the hose under longitudinal tension comprising a head adapted to anchor and seal a plurality of lengths of the hose and a fluid pressure cylinder operatively connected to said head.

6. Apparatus for vulcanizing hose, the said apparatus comprising members adapted to restrain two opposite sides of the hose to hold it in oblong cross-sectional form without full external mold contact, means for holding the hose under longitudinal tension, means for passing a heating fluid through the hose, and means for preventing heat losses through the restraining means.

GEORGE K. BEDUR.